United States Patent
Takemura et al.

[11] Patent Number: 5,809,007
[45] Date of Patent: Sep. 15, 1998

[54] OPTICAL DISK AND OPTICAL DISK REPRODUCTION APPARATUS

[75] Inventors: Yoshinari Takemura, Settsu; Shunji Ohara, Higashiosaka; Takashi Ishida, Yawata; Yoshito Aoki, Moriguchi; Shigeru Furumiya, Himeji; Toyoji Gushima, Habikino, all of Japan

[73] Assignee: Matsushita Electric Industrial Co., Ltd., Osaka, Japan

[21] Appl. No.: 729,748

[22] Filed: Oct. 7, 1996

[30] Foreign Application Priority Data

Oct. 9, 1995 [JP] Japan ................................ 7-261244
Feb. 9, 1996 [JP] Japan ................................ 8-023565

[51] Int. Cl.⁶ ........................................... G11B 7/00
[52] U.S. Cl. .................... 369/275.3; 369/275.4; 369/32
[58] Field of Search ................... 369/275.1–275.5, 369/32

[56] References Cited

U.S. PATENT DOCUMENTS 5,297,131  3/1994  Tanaka ............................. 369/275.3
5,457,674  10/1995  Watanabe et al. .................... 369/54
5,563,872  10/1996  Horimai .......................... 369/275.3

FOREIGN PATENT DOCUMENTS 265 849      5/1988   European Pat. Off. .
469 727      2/1992   European Pat. Off. .
41 14 234   11/1991   Germany .
96116062.9   6/1986   Japan .

*Primary Examiner*—Nabil Hindi
*Attorney, Agent, or Firm*—Wenderoth, Lind & Ponack

[57] ABSTRACT

An optical disk of the present invention has one or more recording tracks formed concentrically or spirally on the disk to which data signals are recorded by forming different-length marks and spaces on the tracks. An ID signal combining marks and spaces of two or more predetermined lengths approximately equal to the length of the marks and spaces forming the data signals is recorded to the recording tracks within a predetermined disk area, thus creating the ID signal by aligning the marks and spaces in the radial direction and recording the aligned marks and spaces to adjacent tracks in a predetermined radial disk area. Also, a reproduction apparatus for reproducing signals from the optical disk is disclosed.

15 Claims, 15 Drawing Sheets

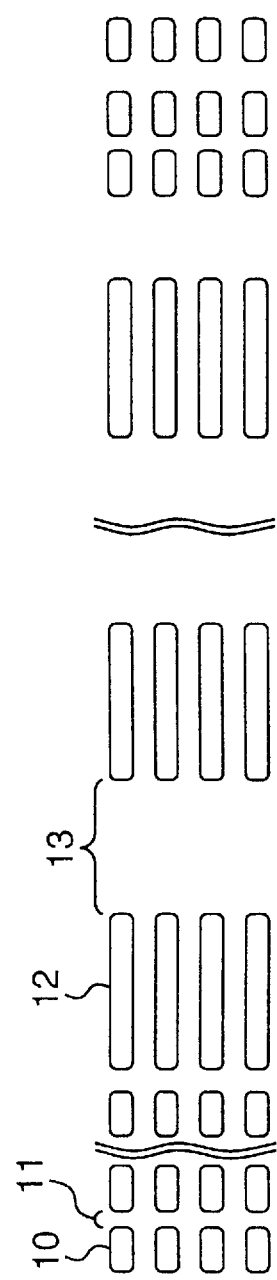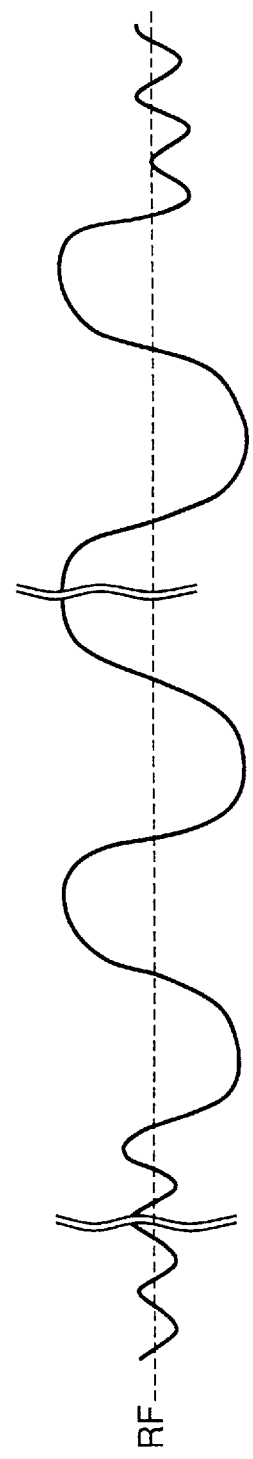
Fig. 1A
Fig. 1B

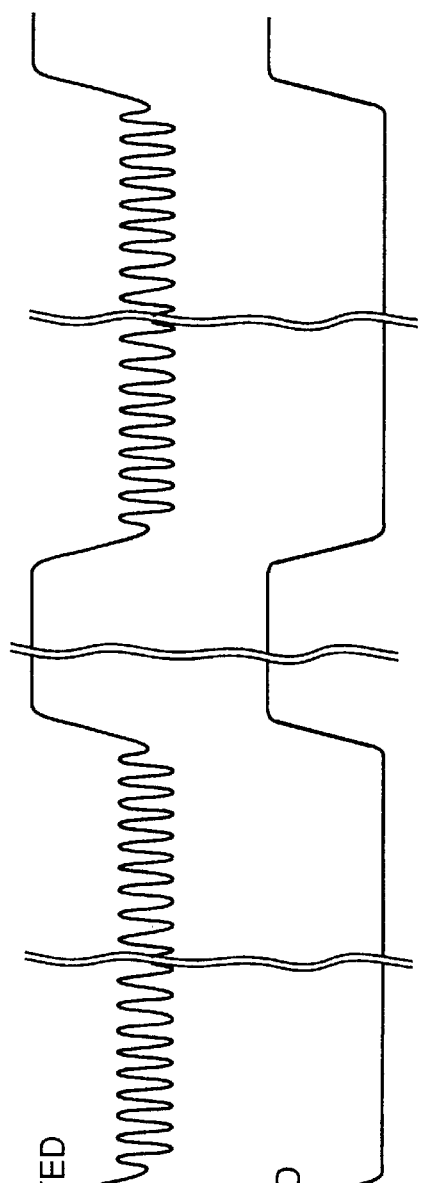
Fig.3A PRIOR ART BEAM TRACE
Fig.3B PRIOR ART REFLECTED LIGHT
Fig.3C PRIOR ART FILTERED SIGNAL

TRACK FORMAT IN PEP AREA

SECTOR FORMAT IN PEP AREA

| DATA | RECORDING CODE |
|------|----------------|
| 0 0 0 | 0 0 0 1 0 0 |
| 1 0 | 0 1 0 0 |
| 0 1 0 | 1 0 0 1 0 0 |
| 0 0 1 0 | 0 0 1 0 0 1 0 0 |
| 1 1 | 1 0 0 0 |
| 0 1 1 | 0 0 1 0 0 0 |
| 0 0 1 1 | 0 0 0 0 1 0 0 0 |

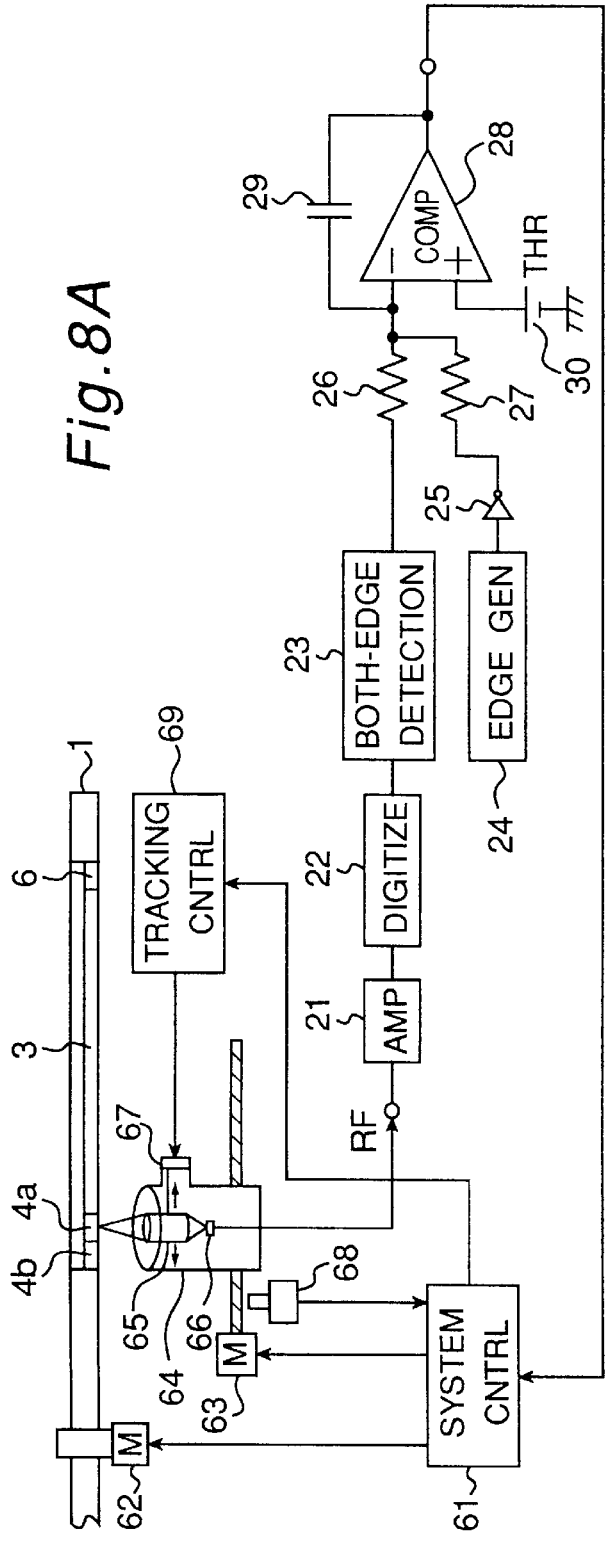
Fig.8A
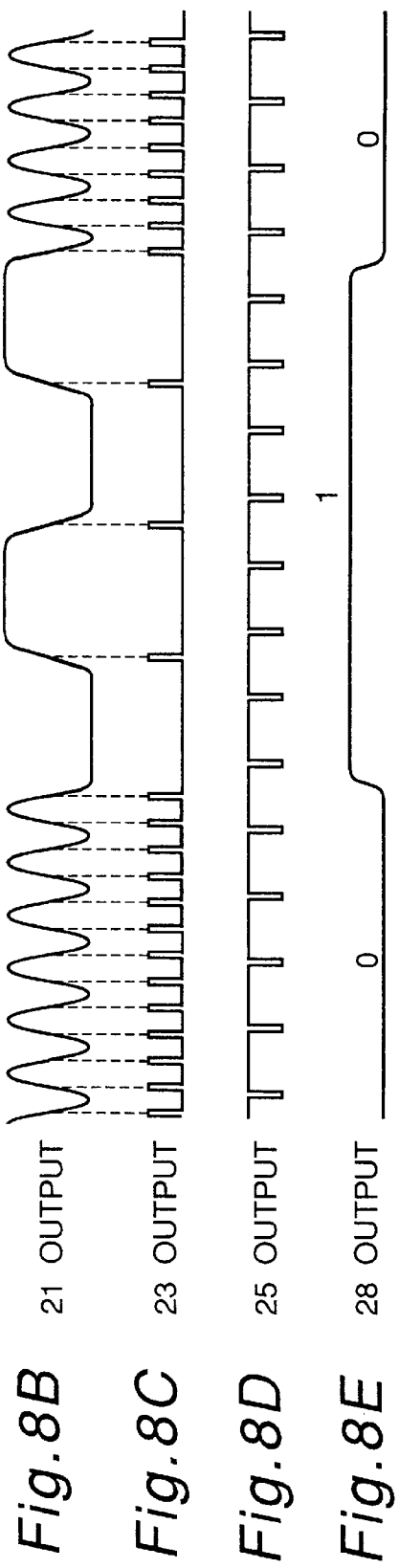
Fig.8B  21 OUTPUT
Fig.8C  23 OUTPUT
Fig.8D  25 OUTPUT
Fig.8E  28 OUTPUT

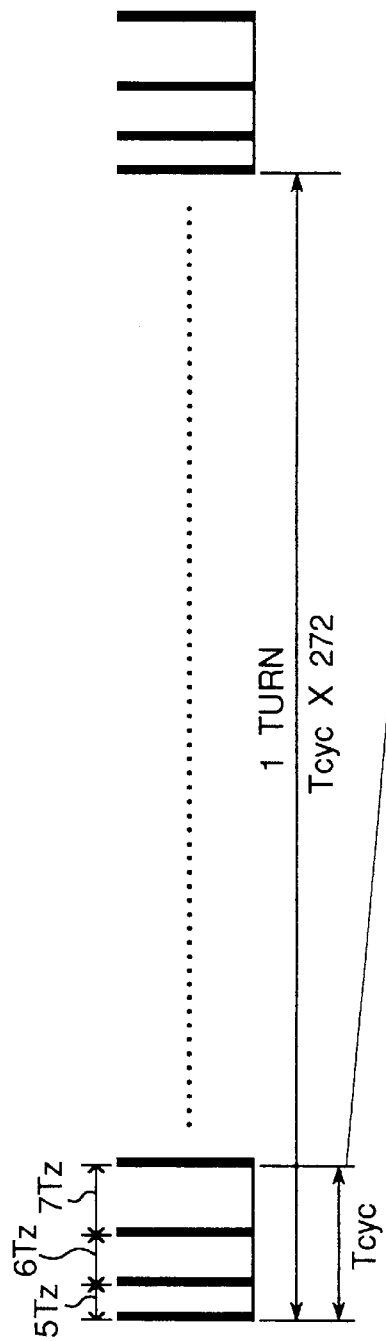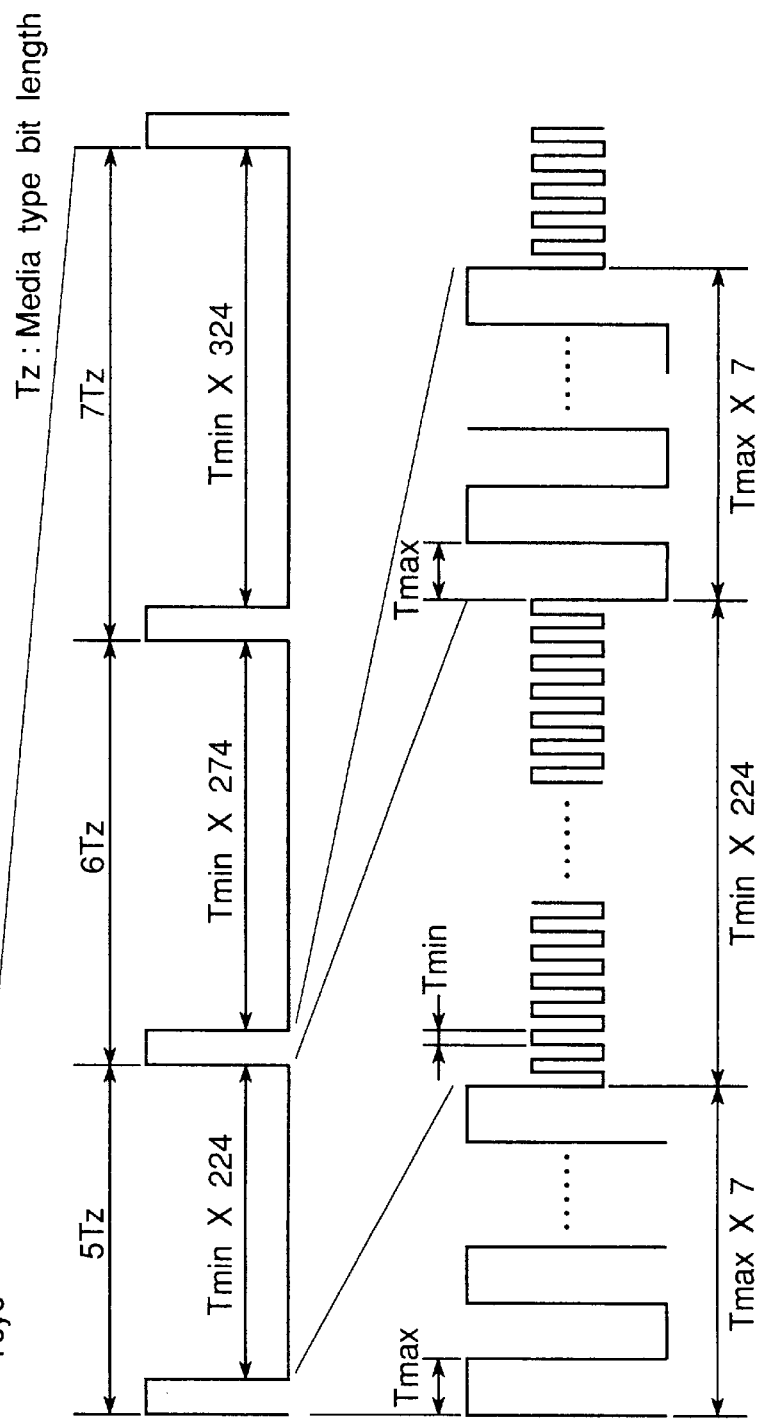
Fig. 10A  Fig. 10B  Fig. 10C

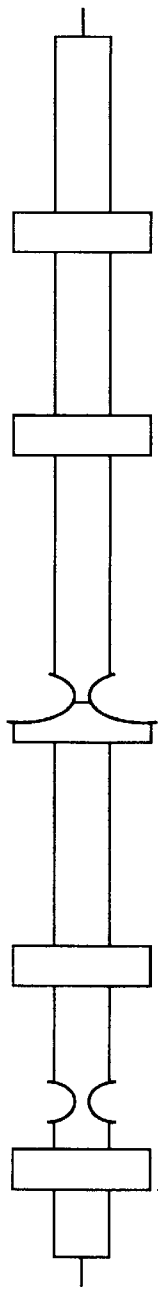
Fig. 14A 33 OUTPUT
Fig. 14B 46 OUTPUT
Fig. 14C 47 OUTPUT
Fig. 14D 37 OUTPUT
Fig. 14E 38 OUTPUT
Fig. 14F 39 OUTPUT
Fig. 14G 40 OUTPUT

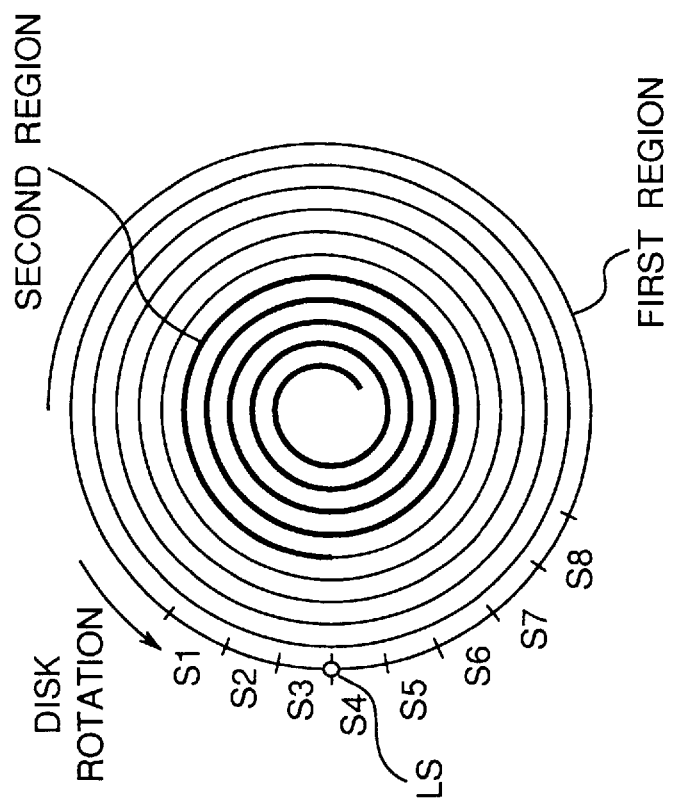
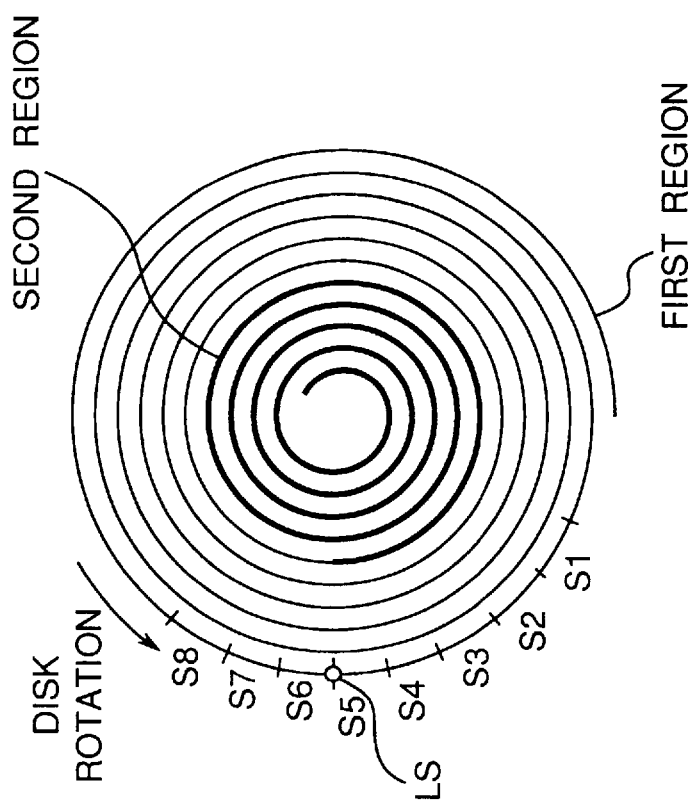

OPTICAL DISK AND OPTICAL DISK REPRODUCTION APPARATUS

BACKGROUND OF THE INVENTION

1. Field of the Invention

The present invention relates to an optical disk comprising an ID (identification) signal for identifying the type of disk or other parameter, and to a reproduction apparatus for the optical disk.

2. Description of the Prior Art

Optical disks are available today in numerous types, including audio CD, CD-ROM, and other read-only media; write-once, read-many (WORM) media; and erasable/rewritable media. Some of these media are also available in plural types, e.g., read-only, WORM, and erasable, using the same physical media size (outside disk diameter).

There are also various disk formats and parameters that are set for recording or reproduction. As a result, information describing the disk format and various parameters is prerecorded to a predetermined area of the disk as ID signals. These ID signals must be read before the disk drive is set up for recording or reproducing the optical disk. A signal that can be reproduced by using only focusing control is therefore desirable.

In one relatively simple example using an optical disk with concentric or spiral grooves formed as tracks, the grooves are interrupted at a regular interval along the tracks in a predetermined region of the optical disk, and the signal is arrayed across plural adjacent tracks. The area to which the ID signal is recorded with this method is shown in FIGS. 2A and 2B. The optical disk 14, spindle hole 15, and data recording area 16 are shown in FIG. 2A. The ID signal 17 is formed at the inside of the data recording area 16. The area to which the ID signal 17 is recorded is shown enlarged in FIG. 2B. The tracks, indicated by the dotted line, contain both grooved 19 and ungrooved 18 segments. Note that the grooves 19 are aligned across adjacent tracks.

The ungrooved area 18 is a flat mirror surface and therefore reflects more light when illuminated by an optical head than does the grooved area 19. Refraction in the grooved area 19 causes less light to be reflected than from the ungrooved area 18. It is therefore possible to detect the presence of the ID signal by simply comparing the intensity of the reflected light using the optical head or other light-emitting means.

A conventional method of coding control data for recording as the ID signal used to record various types of control information is described next. One such method is described in Japanese Industrial Standard (JIS) X6271, which specifies a PEP region provided in the control data track of 130 mm rewritable optical disks.

Pre-recorded marks are used in this PEP region with all marks in the region arranged in an ordered array in the radial direction. This is simulated in FIG. 3A in which a line traced by a beam is shown in dotted line. The marks and spaces between the marks are two channel bits long. The PEP bit cell length is 656 ±1 channel bit. As shown in FIG. 4, the PEP bit cell information identifies whether the mark group is in the first or second half of the bit cell by means of 0 or 1 logic.

As a result, 561–567 PEP bit cells are recorded per track revolution. The track format in the PEP region comprises three sectors as shown in FIG. 5 (a). The format of each sector is shown in FIG. 5 (b). The numbers shown in the figure are the numbers of PEP bits allocated to each signal. The data part of each control signal has an 18-byte (144 PEP bit) capacity. (For details on the control signal content, see JIS X6271.)

When light is emitted to this PEP region from an optical head, the area in which the marks are not formed is a mirror surface with high reflectance. The reflectance of the area in which the marks are formed is modulated by the marks, and the average reflectance is less than that of the mirror surface area. The change in reflectance is shown in FIG. 3B. It is thus possible to detect the PEP bit cell information by comparing the intensity of the emitted light reflected from both areas.

For example, if this optical disk is driven at 1800 rpm, light is emitted to the PEP region from the optical head, and the reproduction signal is obtained from the reflected light, the repeat frequency of the marks is approximately 2.8 MHz, and the PEP bit cell output rate is approximately 17 kbit/sec. Because the mark repeat frequency is thus higher than the PEP bit cell frequency, the mark signal component can be removed by limiting the reproduction signal bandwidth.

For example, the reproduction section that extracts a servo signal is constructed to reproduce signals in a bandwidth from DC to several hundred kilohertz. A waveform of the PEP region reproduced by the servo signal amplifier is shown in FIG. 3C. Because the area in which the mark group is recorded results in a high frequency signal, it is outside the amplification bandwidth, and the reproduction signal level drops. The reproduction signal level increases in the mirror surface area. The PEP bit information can therefore be detected by comparing these reproduction signal levels.

To record an ID signal by means of the prior art as described above, it is thus necessary to alternately form an area in which grooves or series of marks continue for a predetermined distance along the recording tracks with the grooves or marks arrayed to adjacent tracks, and a flat (mirror surface) area containing no marks or grooves. When forming such disks, however, the resin flows differently in the continuous groove or mark sequence area and the continuous mirror surface area, and it is difficult to consistently mold the disks.

With 130 mm rewritable optical disks, a control data track (the SFP area cited in JIS X6271) to which detailed control information is recorded must be reproduced after extracting the basic control information from the PEP area. To read the information from this control data track, tracking must be controlled specifically for that disk, and information recorded according to the specified data format must be reproduced.

Maintaining stable tracking control based on the extracted control information is difficult in the PEP area, even after tracking control becomes possible, because of the presence of approximately 300 channel bit long areas with no marks, i.e., mirror surface areas, in the PEP area. Tracking control is therefore applied after entering the SFP area, and a delay period is required until control stabilizes.

To enable the data recorded to the PEP area to be reproduced at the servo signal bandwidth, the PEP bit cell length must be increased, thus limiting the recording capacity per track revolution to 561–567 PEP bit cells.

Each track revolution is also divided into three sectors each recorded with the same information as a means of improving reliability. Each sector contains a preamble, sector number, and. CRC, leaving a data capacity of only 18 bytes. As a result, only 18 bytes of control information can be recorded to the entire PEP area.

SUMMARY OF THE INVENTION

The object of the present invention is therefore to provide an optical disk in which the recording capacity is improved when compared with an optical disk as described above, disk molding is made simple, an ID signal enabling stable tracking control is recorded, and to provide a reproduction apparatus for the optical disk.

To achieve the above objects in an optical disk comprising one or more recording tracks formed concentrically or spirally to the disk on which data signals are recorded by forming variable length marks and spaces on the tracks, an ID signal combining marks and spaces of two or more predetermined lengths approximately equal to the length of the marks and spaces forming said data signals is recorded to the recording tracks within a predetermined disk area with the ID signal created by aligning the marks and spaces in the radial direction and recording the ordered marks and spaces to adjacent tracks in a predetermined radial disk area.

To further achieve the above objects, an optical disk having one or more recording tracks formed concentrically or spirally on a disk to which data signals are recorded on the tracks is provided, the optical disk comprises a user data area for storing user data using different-length marks which vary between a maximum length Tmax and a minimum length Tmin and different-length spaces which also vary between the maximum length Tmax and the minimum length Tmin; and an ID signal area for storing an ID signal using at least first and second marks and first and second spaces, the first mark and the first space both having a first predetermined length selected from various lengths in the different-length marks, and the second mark and the second space both having a second predetermined length selected from various lengths in the different-length marks, the ID signal being stored in a plurality of turns of tracks with same length marks aligned in a radial direction.

Further provided is an optical disk reproduction apparatus for reproducing the above-mentioned optical disk in which the first mark and the first space being repeated M (M is a positive integer) times defining a first pattern and subsequently the second mark and the second space being repeated N (N is a positive integer) times defining a second pattern. The optical disk reproduction apparatus comprises a reading means for reading marks and spaces from the optical disk and for producing an RF signal; and an accessing means for accessing the reading means to the ID signal area for reading the ID signal by the reading means.

BRIEF DESCRIPTION OF THE DRAWINGS

The present invention will become more fully understood from the detailed description given below and the accompanying diagrams wherein:

FIG. 1A is a diagram showing an arrangement of pits formed in an ID signal area.

FIG. 1B is a graph showing waveforms of the ID signal obtained by the pits shown in FIG. 1A.

FIG. 3A shows the arrangement of the marks in the PEP area according to the prior art.

FIGS. 3B and 3C show waveforms obtained from the PEP area shown in FIG. 3A.

FIG. 8A is a block diagram showing one example of the signal processor used in an optical disk reproduction apparatus according to the first embodiment of the present invention.

FIGS. 8B, 8C, 8D and 8E show format diagrams of the ID signal recorded to an optical disk according to the first embodiment of the present invention, and particularly showing waveforms obtained in the signal processor of FIG. 8A.

FIGS. 10A, 10B and 10C show format diagrams of the ID signal recorded to an optical disk according to the second embodiment of the present invention.

FIGS. 14A, 14B, 14C, 14D, 14E, 14F and 14G show waveforms obtained in the signal processor of FIG. 13.

FIGS. 15A and 15B show diagrams of the front and back recording surface sides of an optical disk according to the preferred embodiments of the present invention.

DESCRIPTION OF PREFERRED EMBODIMENTS

The preferred embodiments of the present invention are described below with reference to the accompanying figures.
Embodiment 1

Figure 6A:
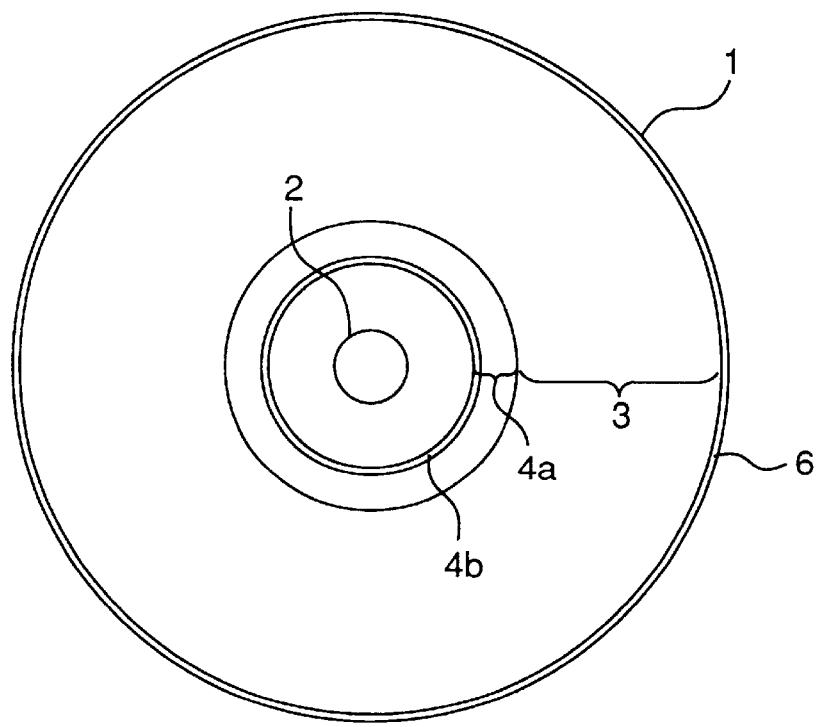
FIGS. 6A and 6B show the layout of optical disks according to the preferred embodiment of the present invention.

A rewritable optical disk to which user data can be freely written and erased is described as the first embodiment of the present invention. As shown in FIG. 6A, an optical disk 1 according to the present invention comprises a spindle hole 2, data recording area 3 in which concentric or spiral grooves are formed for recording data, lead-in area 4, ID (identification) signal area 4b, and lead-out area 6. Note that the lead-in area 4 is formed on the inside and the lead-out area 6 is formed on the outside of the data recording area 3.

The lead-in area 4 in this embodiment comprises a control data area 4a to which control data containing detailed information used to control disk recording and reproduction is recorded, and an ID signal area 4b to which an ID signal providing basic disk information is recorded. Note, further, that the ID signal area 4b is recorded on the inside circumference side of the control data area 4a.

Figure 6B:
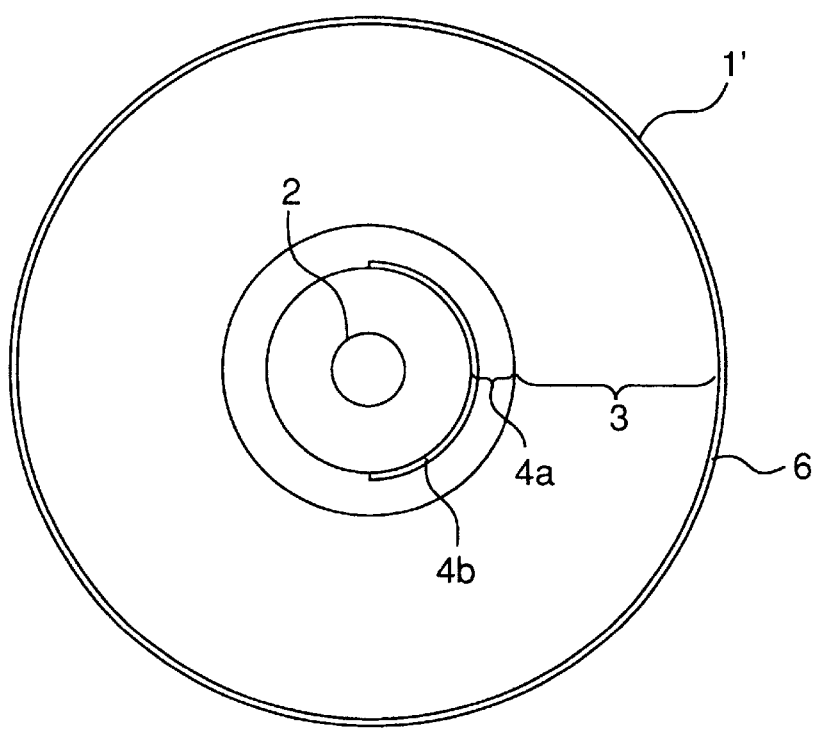

FIG. 6B shows a modification of the optical disk 1. According to the optical disk 1 shown in FIG. 6A, the ID signal area 4b is formed in a complete circle, but the optical disk 1' shown in FIG. 6B has the ID signal area 4b' formed in a half circle.

To facilitate accessing a rewritable optical disk, each track is divided into appropriately sized sectors, and an identification (ID) number containing the address number is recorded to each sector. These ID signals and the signals recorded to the control data area 4a are recorded by, for example, interrupting the grooves of the signal recording area during disk manufacture, and forming pits representing the recorded signals.

Digital data in general is recorded by modulating the data using a recording code. Run-lengthlimited coding is often used to limit the maximum run length of the code, limit the length of the shortest code segment, and narrow the bandwidth of the reproduction signal to avoid repeating the same code continuously and thereby make clock detection difficult during reproduction. The present embodiment is therefore described below using (2,7) Run-lengthlimited coding (RLL coding).

Figures 6C, 7:
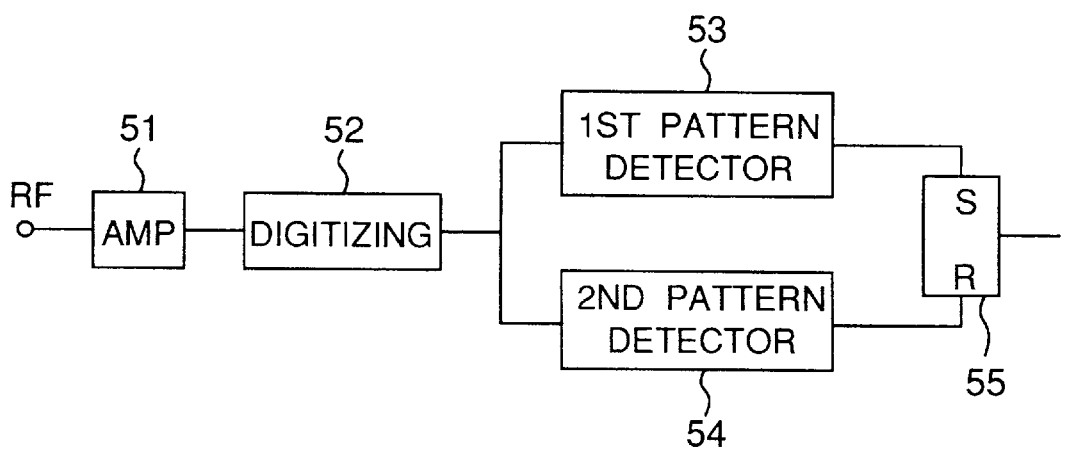
FIG. 6C is a (2,7) RLL coding conversion table of the data codes and the corresponding recording codes used in the preferred embodiment of the present invention.
FIG. 7 is a block diagram of a signal processor used in an optical disk reproduction apparatus according to the present invention.

In (2,7) RLL coding, one data bit is converted to two channel bits using a conversion table as shown in FIG. 6C. The bits of the recording code words in FIG. 6C are called "channel bits," and the period T is the channel bit interval. A "1" in the recorded code word indicates inversion of the recorded bit value. As shown in FIG. 6C, the maximum bit inversion interval Tmax is 8T, and the minimum bit inversion interval Tmin is 3T. As shown in FIG. 6C, there are six different code length combinations (3T, 4T, 5T, 6T, 7T, 8T). Pits are then formed in the disk recording surface according to these code lengths. Note that the pits are referred to as "marks," and the intervals between pits are referred to as "spaces" in this embodiment.

There are two basic optical disk drive methods, constant angular velocity (CAV) drive and constant linear velocity (CLV) drive. With CAV drive, the disk is driven at a constant rotational speed. With CLV drive, the rotational speed is varied so that the linear velocity is constant during recording and reproduction. With CLV drive, all marks modulated to the same code length have the same length at all points on the disk. With CAV drive, however, the physical on-disk length of marks modulated to the same code length varies according to the radial position of the recorded track. With a 130 mm rewritable optical disk, for example, there is approximately two times as much difference between the physical length of marks representing the same code word formed at the inside circumference track and the outside circumference track. This means that the Tmax interval at the outside circumference is approximately six times longer than the Tmin interval at the inside circumference when the marks and spaces are formed with (2,7) RLL coding. The molding conditions used to manufacture CAV drive disks are therefore set to prevent any difference in the quality of the marks and spaces formed within this length range.

With CLV drive disks, CAV drive is used in the ID signal area 4b that is reproduced before the disk type is determined. When this ID signal area 4b is disposed to the inside circumference side of the data recording area 3, the mark length is shorter than the mark length recorded to the data recording area 3, but this difference is minimal. With a 130 mm rewritable optical disk, for example, the inside circumference radius of the PEP area is 29.0 mm, and the inside circumference radius of the user data area (data recording area 3) is 30.0 mm. As a result, marks for the same code length are reduced to 29/30, and it is simple to set the molding conditions to prevent any real qualitative difference.

The ID signal of the present invention is generated using a combination of marks and spaces of approximately the same length as the above range of mark/space lengths resulting from differences in radial position and drive method.

In other words, the ID signal recorded in the innermost circumference side of the disk can be formed with the use of maximum length marks used in the outermost circumference side of the disk. Even with the use of such extraordinary long marks in the innermost circumference side of the disk, such long marks can be made without degrading the quality, because such long marks are not extraordinary in the outermost circumference side of the disk, and such long marks can be made under the same conditions.

The ID signal provided at the innermost circumference side can therefore be molded using comparable molding conditions to those in the outermost circumference side.

The ID signal of the present invention is constructed using various code length combinations of the recording codes satisfying the maximum inversion interval Tmax and minimum inversion interval Tmin constraints. The recording surface of a disk to which an ID signal thus constructed is recorded is shown in FIG. 1A. The marks 10 and spaces 11 modulated to the minimum inversion interval Tmin, and the marks 12 and spaces 13 modulated to the maximum inversion interval Tmax, are formed along the recording tracks as series of pits and lands.

In other words, each mark 10 and each space 11 have the length Tmin which is equal to the minimum length that can be used in the data recording area 3, and each mark 12 and each space 13 have the length Tmax which is equal to the maximum length that can be used in the data recording area 3. Thus, in the case of (2,7) RLL coding, the minimum length Tmin is 3T and the maximum length Tmax is 8T. Note that in the case of the CAV drive, the actual length of the maximum length Tmax (8T) varies relative to the radial position of the recorded track, such that the actual length becomes great as the radial increases. The same can be said for the actual length of the minimum length Tmin (3T). According to the present invention, each mark 10 and each space 11 have the length Tmin selected from any radial position in the data recording area 3, and each mark 12 and each space 13 have the length Tmax selected from any radial position in the data recording area 3.

In one arrangement, each mark 10 and each space 11 have a length Tmin selected from the innermost radial position in the data recording area 3, and each mark 12 and space 13 have a length Tmax selected from the outermost radial position in the data recording area 3. By this arrangement, the difference in length between the marks 10 and 12 can be made greatest using the mark length available in the data recording area 3. Also, by this arrangement, the marks and spaces with the length Tmax appearing in the ID signal area 4b is much longer than the maximum marks and spaces that may appear in the inner radial position of the data recording area 3. Thus, the marks 12 and spaces 13 with the length Tmax in the ID signal area 4b can be distinguished from any of the marks and spaces used in the inner radial position in the data recording area 3. Arranging the marks 10 and spaces 11 with the length Tmin and the marks 12 and spaces 13 with the length Tmax in a predetermined pattern, a special ID signal indicating the type of the disk can be formed. A detail of such a pattern is described below.

The pattern in this example is formed by repeating sequences of same-length marks and spaces. In other words, the marks 10 and spaces 11 with the length Tmin are repeated for a predetermined number of time. This repetition of marks 10 and spaces 11 in a predetermined length can be taken together as one unit of information in a signal processor, as will be explained later, to indicate binary "0". Similarly, the marks 12 and spaces 13 with the length Tmax are repeated for a predetermined number of times. This repetition of marks 12 and spaces 13 in a predetermined length can be taken together as one unit of information in a signal processor, as will be explained later, to indicate binary "1".

This ID signal is recorded for a predetermined number of turns in the ID signal area 4b such that the marks 10 and spaces 11 with the length Tmin are aligned in the radial direction and also the marks 12 and spaces 13 with the length Tmax are aligned in the radial direction.

Note that in the ID signal area 4b, no grooves are provided and no addresses are provided.

The ID signals thus recorded aligned across plural tracks are referred to as the ID signal series below.

The ID signal can also be reproduced without using tracking control by setting the range in the radial direction of the area to which this ID signal series is recorded greater than the maximum eccentricity defined by the specifications of the corresponding disk. For example, the range in the radial direction of the area to which this ID signal series is recorded is between 0.1 mm and 3 mm, which is wide enough to cover the maximum eccentricity of the disk. The waveform reproduced by the reproduction section ("RF reproduction system" below), which applies wide band high frequency amplification to this ID signal series, is shown in FIG. 1B. This reproduction section can satisfactorily reproduce repetitions of the minimum inversion interval Tmin because the reproducible signal bandwidth is wide.

A reproduction apparatus for reproducing the ID signal recorded to an optical disk thus described is described next.

FIG. 7 shows a block diagram of a signal processor of the optical disk reproduction apparatus according to the present invention. The signal processor includes an amplifier 51 for producing an amplified reproduced RF signal (FIG. 8B), digitalizer 52 for producing a digitalized signal (FIG. 8C), a first pattern detector 53 for detecting the first pattern formed by the repetition of marks 10 and spaces 11 with the length Tmin, and for producing a first detection signal, a second pattern detector 54 for detecting the second pattern formed by the repetition of marks 12 and spaces 13 with the length Tmax, and for producing a second detection signal, and a flip-flop 55 which is set in response to the first detection signal and reset in response to the second detection signal.

FIG. 8A shows a detailed example of an optical disk reproduction apparatus according to the present invention having a disk driver and a signal processor.

As shown in FIG. 8A, disk driver of the reproduction apparatus comprises a spindle motor 62 controlled by a system control 61 for rotating the optical disk 1, and an optical head 64 for reading/writing data from/onto the optical disk 1. The optical disk 1 has, from the innermost circumference side, ID signal area 4b, control data area 4a, data recording area 3 and lead-out area 6.

The optical head 64 has a lens 65 for condensing light beams, a tracking actuator 67 for moving the lens 65 in a radial direction within the optical head 64 for fine adjustment, and a photodetector array 66 for converting the reflecting light from the optical disk 1 to electric signals. The tracking actuator 67 is controlled by a tracking control 69 which is in turn controlled by the system control 61. The optical head 64 is moved in the radial direction by a traverse mechanism 63 which is controlled by the system control 61. An inner position detector 68 is provided in the vicinity of traverse mechanism 63 for producing a signal when the optical head 64 is brought to the innermost position, i.e., a position where the laser light beam can be emitted onto the ID signal area 4b.

The optical disk reproduction apparatus further comprises a signal processor having an amplifier 21 for receiving an RF signal from the photodetector array 66, a digitizing circuit 22, both-edge detection circuit 23, integration capacitor 29, operational amplifier 28, reference voltage generator 30, edge pulse generator 24 and inverter 25.

Referring to FIG. 8A, after the optical head 64 is brought to the innermost position, a laser beam is emitted from the optical head 64 to the ID signal area 4b. The light reflected from the disk is detected by photodetector array 66, and converted to an electrical signal supplied to a signal amplifier 21 as the reproduction signal. The amplifier 21 cuts off the dc component and applies high frequency amplification. The amplified RF signal from the amplifier 21 is shown in FIG. 8B.

The RF signal is then digitized by the digitizing circuit 22, and the rise and fall edges of the digitized reproduction signal are detected by the both-edge detection circuit 23 to generate a positive going pulse signal (FIG. 8C) with the pulses corresponding to the detected rising and falling edges. Note that the edge generator 24 is formed by an oscillator and generates a constant frequency pulse signal having a pulse repetition period Tc. The period Tc is equal to 5.5T which is selected as the median between the maximum inversion interval Tmax (8T) and minimum inversion interval Tmin (3T) used in the ID signal. The pulse signal is inverted by the inverter 25, and the negative going signal is shown in FIG. 8D. The positive going pulse signal (FIG. 8C) from the both-edge detection circuit 23 and the negative going pulse signal (FIG. 8D) from the inverter 25 are then passed through resistances 26 and 27, respectively, and supplied to an inverting input of the operational amplifier 28. The noninverting input of the operational amplifier 28 is supplied with a predetermined reference voltage as a threshold value.

The operational amplifier 28 operates as an integrating circuit as a result of the capacitor 29. By each positive going pulse (FIG. 8C) from the both-edge detection circuit 23, the capacitor 29 is charged in one direction (such as in minus (−) direction, because the pulses are applied to the inverting input), and by each negative going pulse (FIG. 8D) from inverter 25, the capacitor 29 is charged in the opposite direction (such as in plus (+) direction). The operational amplifier 28 thus obtains and integrates the difference between these positive going and negative going signals.

Specifically, if the positive going pulses (FIG. 8C) with a pulse repetition period shorter than the 5.5T period is input, the capacitor 29 will be charged more frequently by the positive going pulses than by the negative going pulses. Thus, the charged signal will exceed the voltage of the reference voltage generator 30, and will result in a low level output from the operational amplifier 28 after integration. On the other hand, if the positive going pulses (FIG. 8C) with a pulse repetition period longer than the 5.5T period is input, the capacitor 29 will be charged more frequently by the negative going pulses than by the positive going pulses. Thus, the charged signal will be lower than the voltage of the reference voltage generator 30, and will result in a high level output from the operational amplifier 28 after integration. If a high level output from the operational amplifier 28 corresponds to 1 and a low level output corresponds to 0, the ID signal information can be reproduced by letting Tmin correspond to 0 and Tmax correspond to 1.

After converting the signals to binary data of 0's and 1's, the information can be detected by the same method used to reproduce the user data, i.e., by predetermining the track format, sector format, and the meaning represented by the data bits, as in the PEP area described in the prior art above.

If the period of 1 bit represented by the ID signal is 48T, for example, there can be three repetitions of 16T mark/space sequences at the maximum inversion interval Tmax, or eight repetitions of 6T mark/space sequences at the minimum inversion interval Tmin. A detection circuit using an RF reproduction system as shown in FIG. 8A can detect the ID signal at this number of repetitions.

If the wavelength of the semiconductor laser used for reproduction is 680 nm and the aperture of the objective lens is NA 0.55, 0.7 μm long marks and spaces can be reliably reproduced as the shortest marks (Tmin). If the ID signal bit sequence is constructed as described above, each bit will be 11.2 μm long. If such bits are recorded to the inside circumference (23 mm radius) part of the disk, a recording capacity of approximately 13 Kbits per track is achieved. Note that this is approximately twenty times the capacity of the PEP area in a conventional disk as described above.

Second Embodiment

In the second embodiment of the invention described below an ID signal used to identify the media type is also recorded. While there are various types of media, including rewritable and read-only as described above, that can be identified by this ID signal, the present embodiment is described below as recording an ID signal as shown in FIGS. 10A, 10B and 10C only to rewritable media.

Figure 2A:
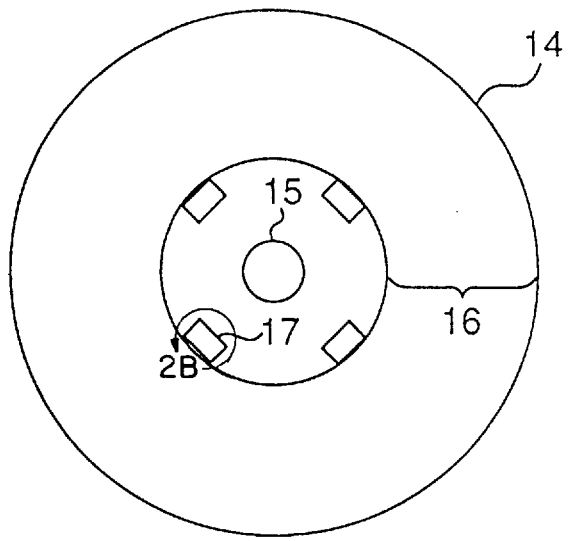
FIGS. 2A and 2B show the arrangement of the ID signal area according to the prior art.
Figure 2B:
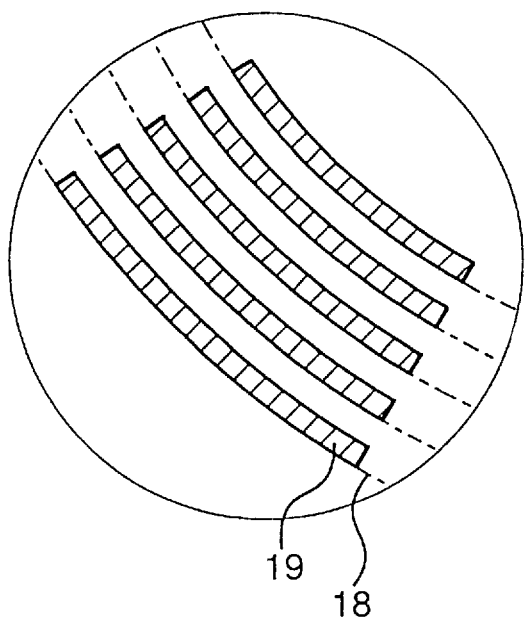
Figure 4:
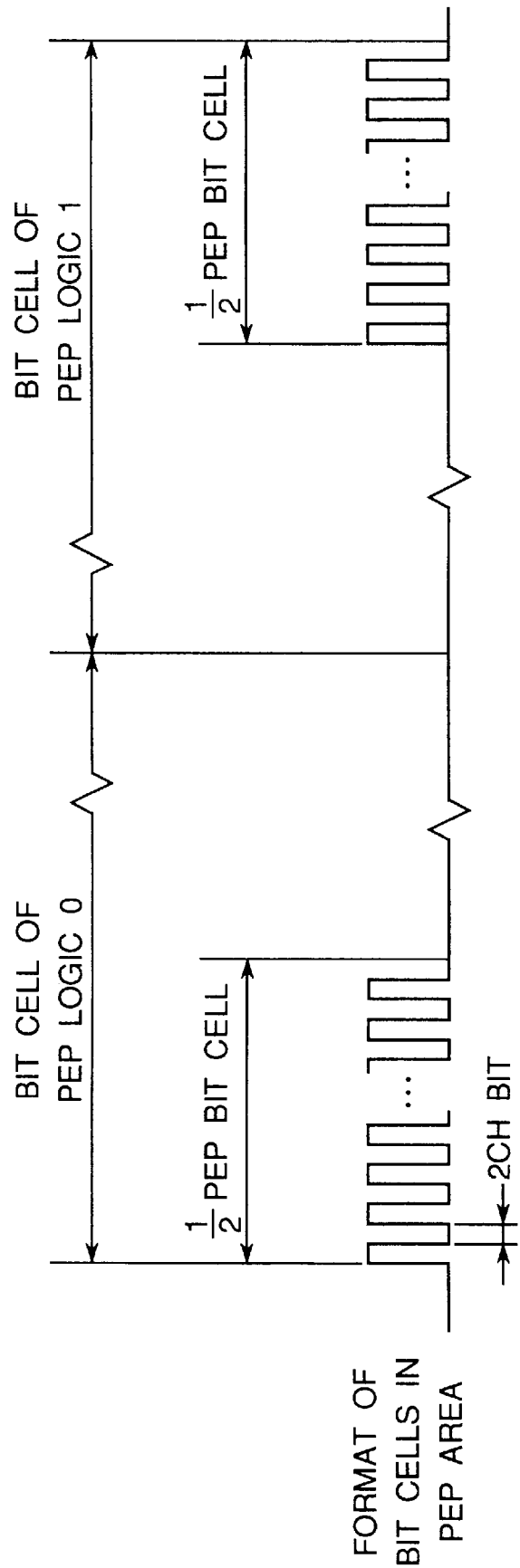
FIG. 4 shows the format of the pit cells in the PEP area according to the prior art.
Figure 5A:
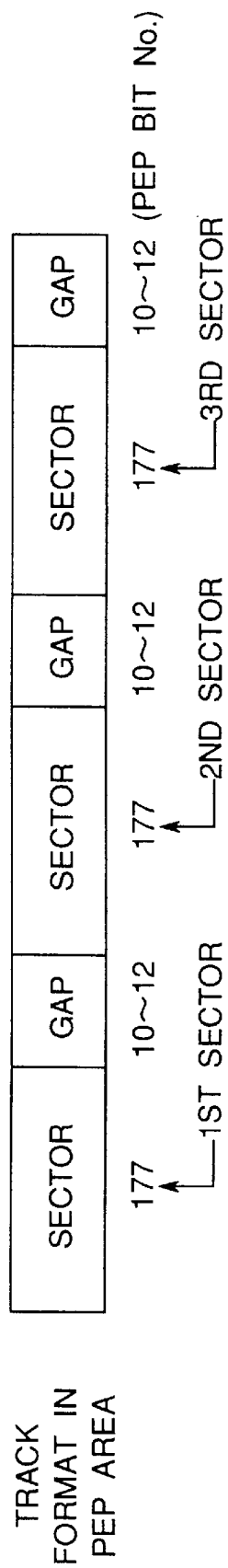
FIGS. 5A and 5B show the track format in the PEP area according to the prior art.
Figure 5B:
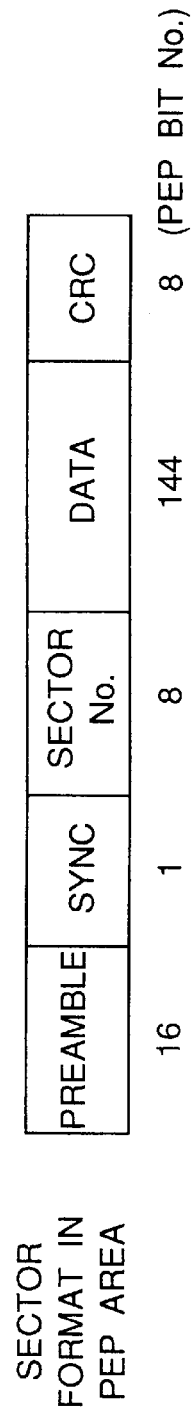

In the second embodiment, Tmax corresponding to mark 12 shown in FIG. 1A is 8T and Tmin corresponding to mark 10 in FIG. 1A is 3T as in the first embodiment. If Tmin is repeated 224, 274, and 324 times per cycle Tcyc, the number of Tmin repetitions per cycle is in a ratio of approximately 5:6:7. If the unit of the cycle is the media type bit length Tz, the cycles are 5Tz, 6Tz and 7Tz, and Tz is approximately 146T. As shown in FIG. 10A, 5Tz+6Tz+7Tz is one cycle Tcyc, and 272 cycles of Tcyc are recorded per disk rotation. If this signal is recorded to the inside circumference (23 mm radius) of the disk, the shortest mark (Tmin) is 0.6 μm, and 0.6 μm marks and spaces can be reliably reproduced using an optical head as described in the first embodiment above.

A reproduction apparatus for reproducing the media type ID signal described above is described next below. Note that while the reproduction circuit of the first embodiment shown in FIG. 8 can be used, an alternative method is described below.

Figure 11:
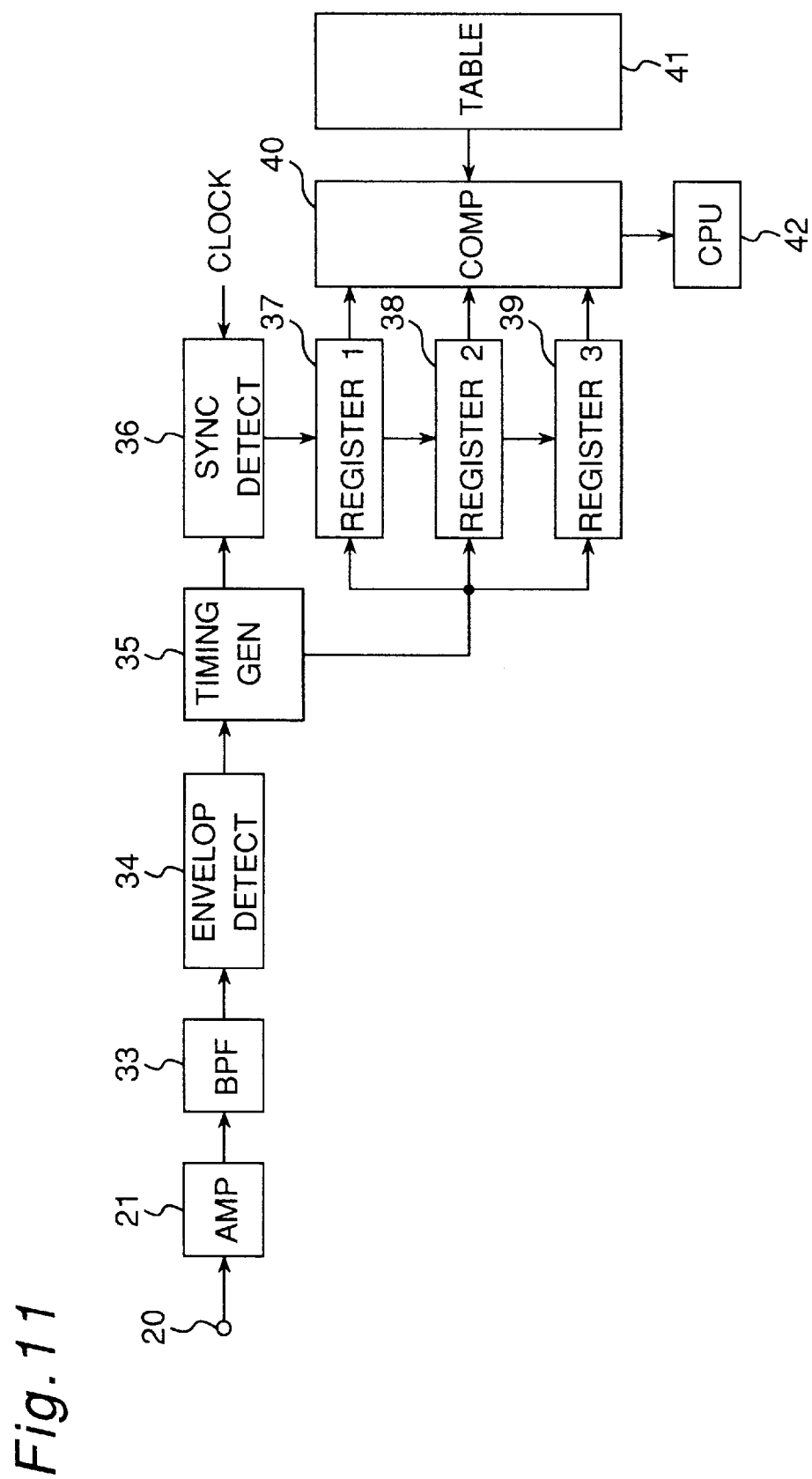
FIG. 11 is a block diagram of the signal processor of an optical disk reproduction apparatus according to the second embodiment of the present invention.

FIG. 11 is a block diagram of the signal processor of an optical disk reproduction apparatus according to this second embodiment of the present invention. As shown in FIG. 11, the signal processor comprises a bandpass filter 33, envelop detector 34, timing generator 35, cycle detector 36, registers 37, 38, and 39, table 41, comparator 40, and system control microcomputer (CPU) 42.

Referring to FIG. 11, a laser beam is emitted from the optical head to the ID signal area 4b, and the light reflected from the disk is detected by a photodetector array 66, and is converted to an electrical signal supplied to a signal amplifier 21 as the reproduction signal. The signal amplifier 21 cuts off the dc component and applies high frequency amplification.

Figure 12:
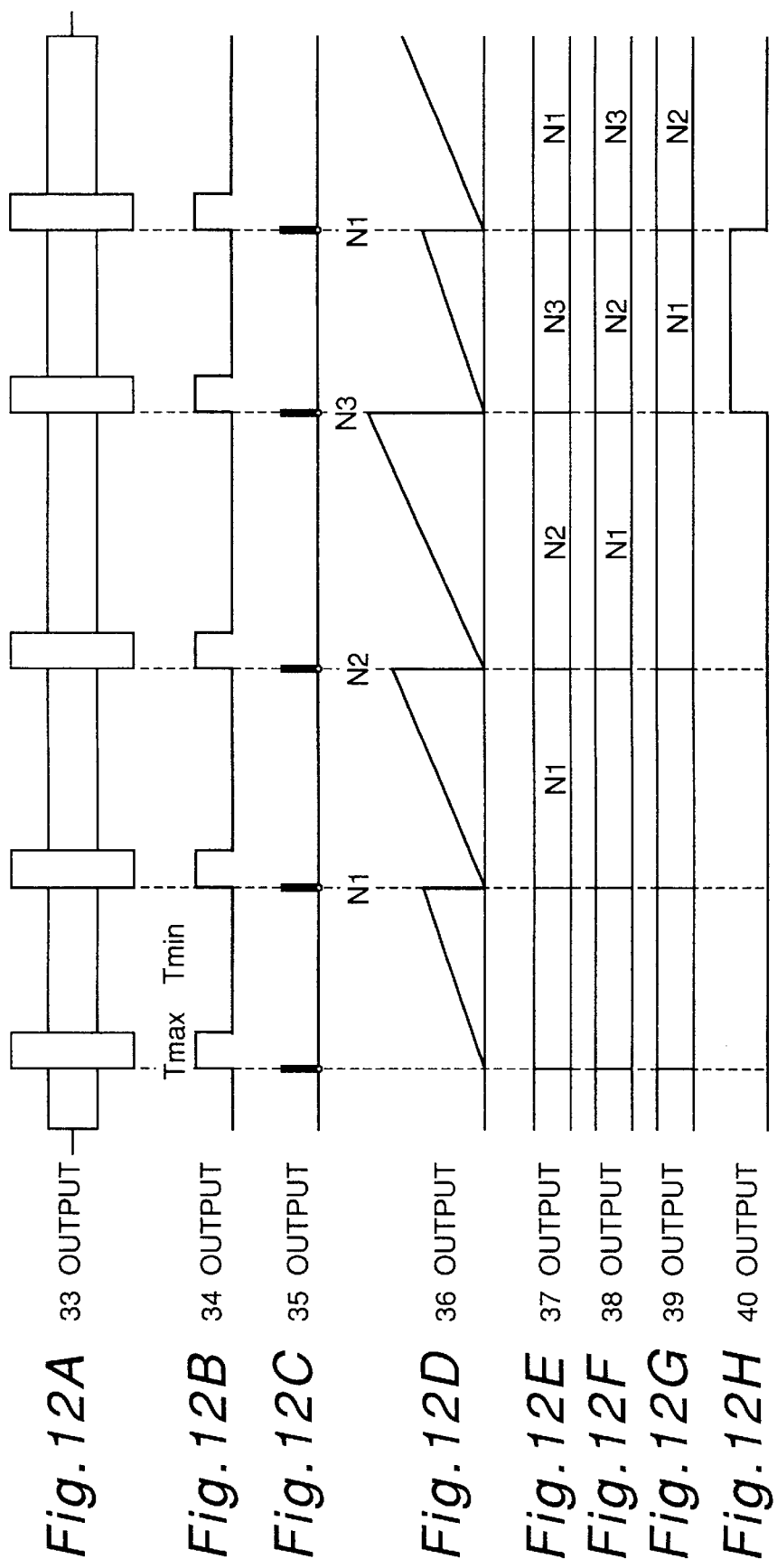
FIGS. 12A, 12B, 12C, 12D, 12E, 12F, 12G and 12H show waveforms obtained in the signal processor of FIG. 11.

The bandpass filter 33 is designed to pass the Tmax repeat frequency without attenuation, attenuate to one in several parts at the Tmin repeat frequency, and significantly attenuate the low and high frequency components outside the ID signal bandwidth. The output signal of the bandpass filter 33 is shown in FIG. 12A, which particularly shows the reproduction signal envelop. The amplitude of the Tmax repeat segment is high while the amplitude of the Tmin repeat segment decreases according to the attenuation characteristics.

The envelop detector 34 detects the envelop of the reproduction signal (FIG. 12A). The detection signal (FIG. 12B) as detected by the envelop detector 34 has a high level in the Tmax segments. The timing generator 35 generates a start signal (FIG. 12C) for counting the cycles synchronized to the rise of the detection signal (FIG. 12B), and a write signal (FIG. 12C) for writing the obtained count to a register. The start signal may be the trailing edge of the pulse shown in FIG. 12C and the write signal may be the leading edge of the same pulse. The cycle detector 36 counts the number of cycles between start signal (FIG. 12C) inputs based on a supplied clock signal. When the start signal (FIG. 12C) is input, the accumulated count is reset, and counting begins anew.

The counting and reset are shown in FIG. 12D. Counting starts from the input of the start signal (FIG. 12C), and the count rises with time such that the longer the period to the next start signal, the higher the count rises. The value of the count immediately before the count is reset by the start signal and is written to the first register 37 by the write signal (FIG. 12C). The next write signal shifts the content of the first register 37 to the second register 38. The next write signal then shifts the content of the second register 38 to the third register 39, and the content of the first register 37 to the second register 38 (FIGS. 12E, 12F and 12G).

The three registers thus store the counts accumulated through three consecutive periods. In the example in FIG. 12D, the values N1, N2, and N3 are the counts corresponding to the ID signal periods 5Tz, 6Tz, and 7Tz. If the clock signal period is T, N1=728T, N2=878T, and N3=1028T, and if the values stored to each register correspond to these values, the media is identified to be a rewritable media.

Because it is necessary to identify the media type as quickly as possible, however, it is desirable to be able to identify the media type before the disk speed reaches the rated speed. If media type identification is executed when the disk speed is. 80% of the rated speed, evaluation is possible when N1>580T, N2>700T, and N3>820T. Here, note that 80% of 728T, 878T and 1028T are about 580T, 700T and 820T, respectively.

These evaluation parameters are stored as the typical values previously in table 41. The comparator 40 compares the values in registers 3, 2, and 1 with the values and value sequence stored to the table 41. If the values and value sequence satisfy the conditions stored in the table 41, the comparator 40 outputs an evaluation signal (FIG. 12H) to the CPU 42. The CPU 42 is then able to determine whether the currently loaded disk is a rewritable disk by detecting this evaluation signal (FIG. 12H). A system control appropriate to a rewritable disk is then applied to control drive operation.

It should be noted that while the media type is determined by evaluating whether the cycle count is within a particular range, the invention shall not be so limited. It is also possible, for example, to evaluate the media type by detecting whether the counts obtained from three consecutive counting periods are sequentially increasing values.

It is also possible, using the ID signal of the present embodiment, to identify the front and back of the disk. The track pattern on a spiral track disk is shown in FIGS. 15A and 15B. The surface to which the optical beam is emitted for recording and reproducing a signal on the disk is referred to as the front surface of the disk, which is shown in FIG. 15A. A spiral track, winding clockwise from the inside circumference to the outside circumference of the disk, is formed on the data surface side of the disk. Recording marks, identified as S1, S2, S3, S4, S5, S6, S7, S8 in the figure, are formed in sequence to a first area of the track. As a result, when the disk is driven counterclockwise and an optical beam, forming an optical beam spot LS, is emitted to the area in which these recording marks are formed, the reproduction sequence becomes S1→S2→S3→S4→S5→S6→S7→S8. If the ID signal, as shown in FIG. 10A, is recorded to a second region (inner center region) of this track, the reproduction sequence of the ID signal will be 5Tz→6Tz→7Tz.

The track pattern and reproduction sequence when this disk is inserted upside down, such that the disk front and back are reversed, are shown in FIG. 15B. When this disk is viewed from the back, the recording track appears to wind in a counterclockwise spiral from the inside circumference to the outside circumference of the disk. As a result, when the disk is driven counterclockwise and an optical beam is emitted to the area in which these recording units are formed, the reproduction sequence is reversed and becomes S8→S7→S6→S5→S4→S3→S2→S1. It follows that the ID signal recorded to the second region (inner center region) of the track is also reproduced in reverse sequence, i.e., 7Tz→6Tz→5Tz. It is therefore possible to detect whether a disk has been inserted upside down by also storing this reverse sequence of values to the table 41 in the signal processor of the reproduction apparatus shown in FIG. 11, and detecting this reverse sequence using the comparator 40.

The controlling of the reproduction apparatus which reproduces the ID signal of the present invention is described next. The control method applied to discriminate the media type of the inserted disk using the ID signal described above is shown by way of example. The disks used in the example are a rewritable optical disk to which (2,7) RLL coded data is recorded with CAV drive, a read-only optical disk to which (2,7) RLL coded data is recorded with CLV drive, and a conventional CD using EFM coding.

Figure 9:
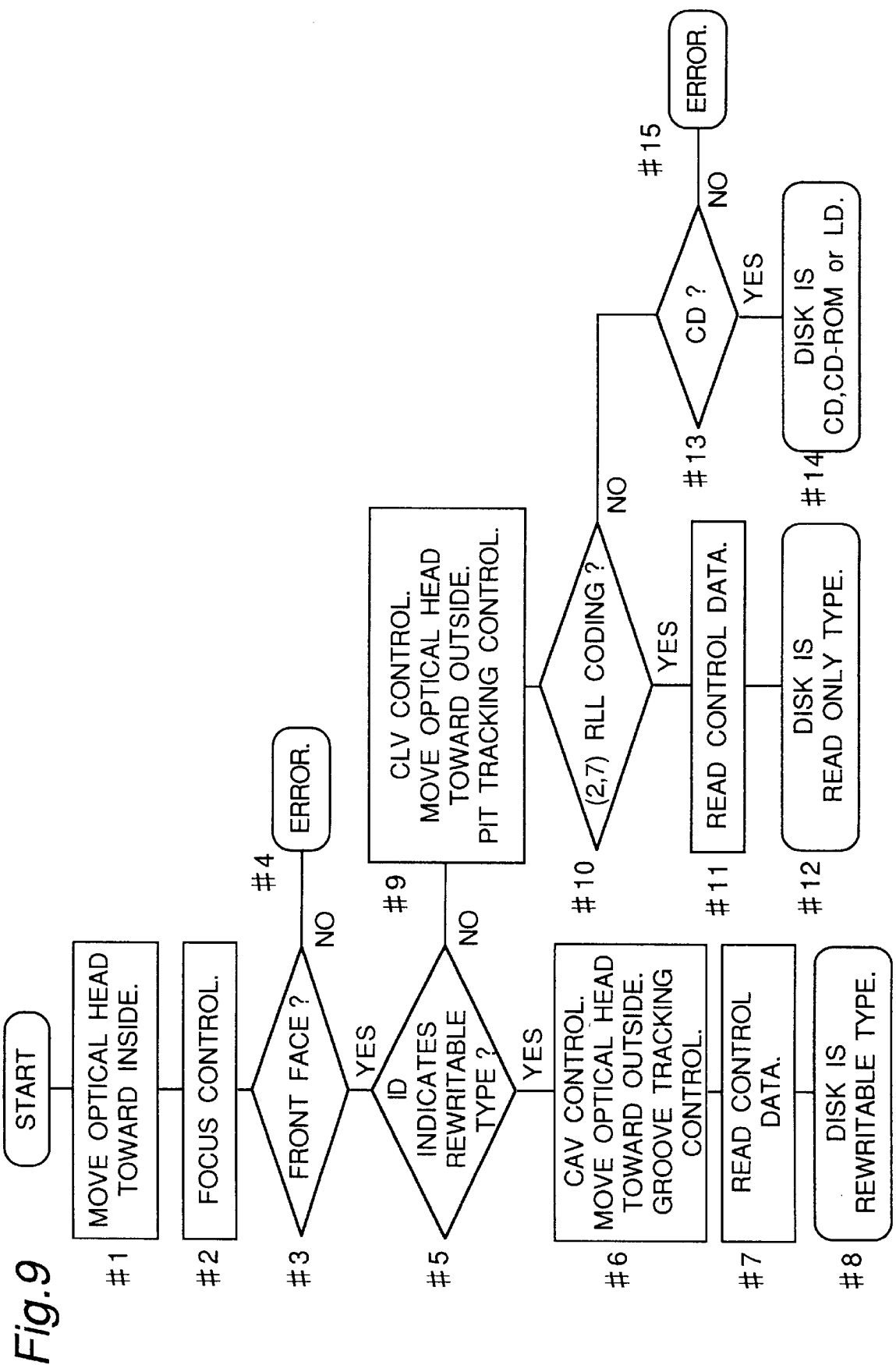
FIG. 9 is a flow chart of the control process used in the second embodiment of the present invention.

A flow chart of this control method is shown in FIG. 9. When a disk is loaded, disk rotation starts, the optical head moves towards the inside circumference area (step #1) and is stopped, in response to the sensing signal from the inner position detector 68, at a radial position where the ID signal is recorded, and a laser beam is emitted at the low output level used for reproduction. Focus control then starts (step #2). The ID signal can be reproduced using only focus control, i.e., without any tracking control, because the ID signal is recorded across a relatively wide radial area, such as between 0.5 mm and 3 mm. The ID signal is then detected using the method described in connection with FIG. 11 (or FIG. 8A). It is then determined whether the surface from which the detected ID signal was reproduced is the front of the disk (step #3). If it is determined that the signal was reproduced from the back side of the disk, reproduction is stopped, the disk is ejected, and an error process indicating to the user that the disk was improperly loaded is executed (step #4).

The detected ID signal is next evaluated to determine the media type (step #5). If the disk is a rewritable media type, the disk is driven with CAV control, the optical head is moved towards the outside circumference area, and tracking is controlled to the grooves (step #6). Because the ID signal of the present invention is a continuous series of marks and spaces, tracking can be stably controlled even in the ID signal recording area. The control data is then read when the optical head enters the control data area outside the ID signal area 4b (step #7). The disk-specific parameters are then set based on the read control data. In this procedure the disk is detected as the rewritable type (step #8).

If the disk is determined to not be a rewritable disk based on the ID signal evaluation, the disk is driven with CLV control, the optical head is moved towards the outside circumference area, and pit tracking control is applied (step #9). Because the ID signal of the present invention is a continuous series of marks and spaces, tracking can be stably controlled even in the ID signal recording area. It is then determined whether the modulation rule of the reproduced signal is (2,7) RLL coding (step #10) when the optical head enters the control data area outside the ID signal area 4b. If (2,7) RLL coding was used, the reproduced signal is demodulated, and the control data is read (step #11). The disk-specific parameters are then set based on the read control data. In this procedure the disk is detected as the read only type (step #12).

If the reproduced signal was not modulated with (2,7) RLL coding, the optical head is moved towards the outside and pit tracking control is applied. Whether the disk is a CD, CD-ROM, or laser disk is then determined (step #13) based on the information read from the table of contents (TOC) area outside the ID signal area 4b. In this procedure, the disk is detected as being any one of CD, CD-ROM, and laser type disk (step #14).

If the media type cannot be determined from the TOC information, reproduction is stopped, the disk is ejected, and error processing indicating that the media type cannot be determined is executed (step #15).

It is therefore possible to determine the type of disk by simply recording information identifying rewritable disks to the ID signal of the present embodiment.

Embodiment 3

A reproduction apparatus capable of handling dropout occurring during ID signal reproduction is described next as the third embodiment of the present invention. Dropout occurs when, for example, there is a defect in the recording film or reflective film, pinholes, or foreign matter trapped inside the disk in the area to which the ID signal is recorded. Dropout may also occur when other information is recorded by removing part of the recording film or reflective film. When dropout occurs, less light is reflected from the disk, and the reproduction signal, amplitude drops. When an ID signal as described in the second embodiment above, is used and dropout occurs in a maximum inversion interval Tmax signal segment, the reproduction signal amplitude drops, Tmax detection is not possible, and the wrong cycle count is obtained.

When the ID signal is evaluated with a wide value range, an unexpected count may be obtained and detection errors occur. The structure of the signal processor of a reproduction apparatus capable of correctly detecting the cycles, even in such cases, is shown in the block diagram in FIG. 13. Note that the reproduction apparatus shown in FIG. 13 differs from that in FIG. 11 due to the substitution of the timing generator 45, and the addition of low band amplifier 46 and dropout detection circuit 47 (voltage drop detection means). Identically numbered parts in FIGS. 11 and 13 perform the same operation.

Figure 13:
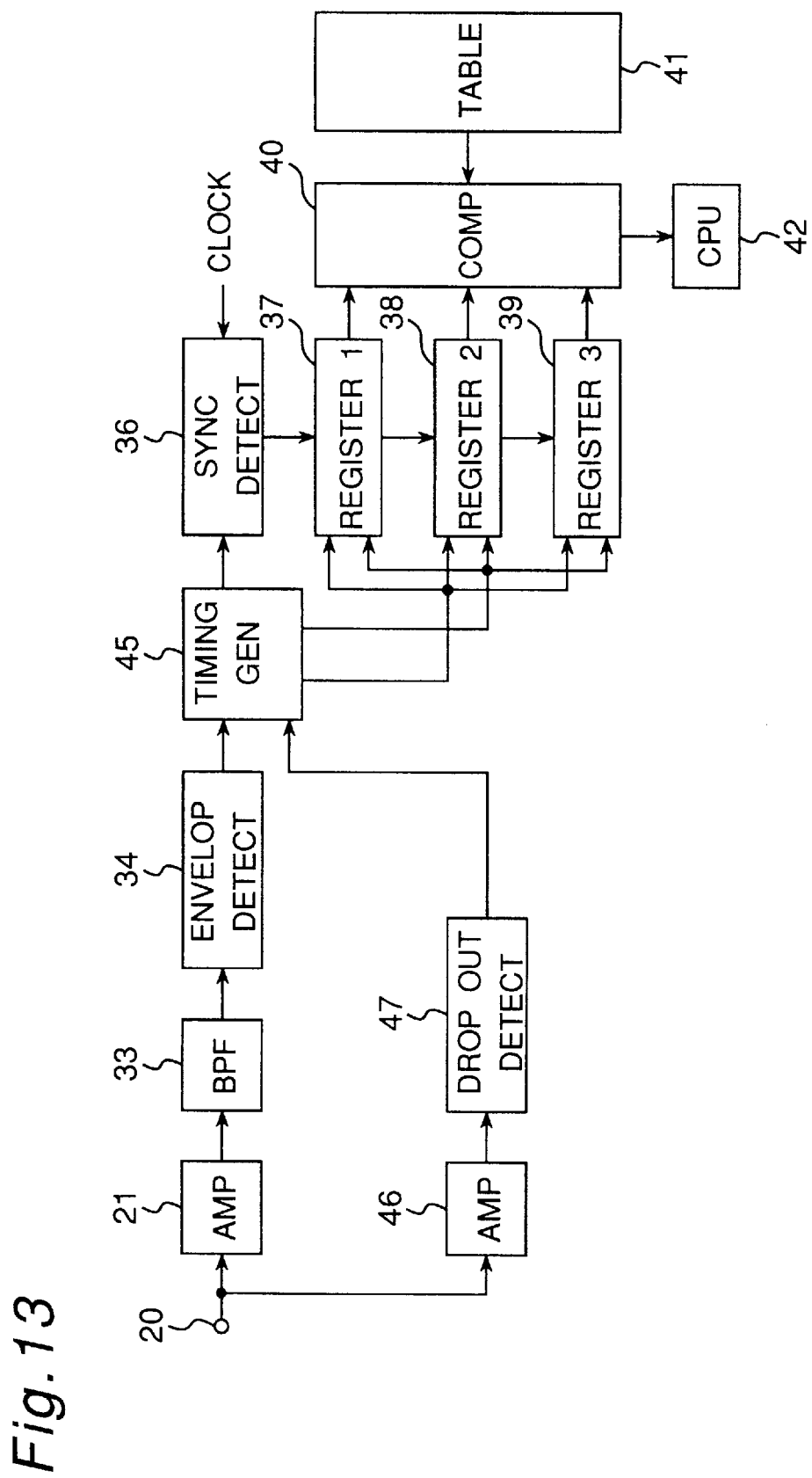
FIG. 13 is a block diagram of the signal processor of an optical disk reproduction apparatus according to the third embodiment of the present invention.

Referring to FIG. 13, a laser beam is emitted from the optical head to the ID signal area 4b, the light reflected from the disk is detected by photodetector array, and is converted to an electrical signal supplied to a signal amplifier 21 as the reproduction signal. The signal amplifier 21 amplifies the signal, which is then reproduced with the same frequency characteristics as in the second embodiment by the bandpass filter 33. The output signal from the bandpass filter 33 is shown in FIG. 14A, which shows the envelop of the reproduction signal. The reproduction signal amplitude drops where dropout occurs.

The envelop detector 34 then detects the envelop of this reproduction signal (FIG. 14A), and outputs a detection signal. The timing generator 45 generates a start signal for counting the cycles synchronized to the rise of the detection signal, and a write signal for writing the obtained count to a register. The cycle detector 36 counts the number of cycles between start signal inputs based on a supplied clock signal. When the start signal is input, the accumulated count is reset, and counting begins anew.

The value of the count immediately before the count is reset by the start signal and is written to the first register 37 by a write signal. The next write signal shifts the contents of the first register 37 to the second register 38, and the next write signal then shifts the contents of the second register 38 to the third register 39, in a manner described above.

The low band amplifier 46 amplifies the signal bandwidth from the reproduction signal dc component to several hundred kilohertz. While the output signal (FIG. 14B) cannot reproduce the Tmax or Tmin repeat signals, it is possible to reproduce the drop in light reflected from the disk as a result of dropout. The dropout detection circuit 47 thus detects when the amplitude of the output signal (FIG. 14B) drops, for example, by the use of a comparator, and produces a dropout signal (FIG. 14C) to the timing generator 45. When the dropout signal (FIG. 14C) is input, the timing generator 45 produces a reset signal to each of the registers 37, 38, and 39. When the registers 37, 38, and 39 receive the reset signal, they clear the cycle counts stored at that time and reset the stored values to 0 (FIGS. 14D, 14E and 14F).

As described with FIG. 11 above, the evaluation parameters are stored to the table 41. The comparator 40 then compares the values in registers 3, 2, and 1 with the values and value sequence stored to the table 41. If the values and value sequence satisfy the conditions stored in the table 41, the comparator 40 outputs an evaluation signal (FIG. 14G) to the CPU 42. The CPU 42 is then able to determine whether the currently loaded disk is a rewritable disk by detecting this evaluation signal (FIG. 14G). A system control appropriate to a rewritable disk is then applied to control drive operation.

It is therefore possible, as thus described, to prevent detection errors when dropout occurs by resetting the registers to use only the counts obtained when dropout did not occur to evaluate the ID signal. Identification is also simplified by using the signals from where dropout does not occur because the ID signal is repeatedly recorded to one revolution of the disk. It is also possible to move the position of the optical head slightly to reproduce the ID signal from a different radial position because the ID signal is recorded to plural tracks aligned in the radial direction of the disk.

It should be noted that while the present invention has been described using (2,7) RLL coding, other coding schemes may be used, including (1,7) RLL coding and 8/16 conversion coding.

While code words with the maximum inversion interval Tmax and code words with the minimum inversion interval Tmin are used as the code words of the ID signal in the above embodiments, code words of other lengths can be used. The ID signal shall also not be limited to code words of only two lengths, and code words of three or more different lengths may be used.

It should also be noted that while the above embodiments have been described as recording the ID signal with an intermittent succession of grooves in a rewritable optical disk, the present invention shall not be so limited. It is also possible, for example, to record the same ID signals to a read-only disk by substituting the pits for the marks and lands for the spaces described above.

By thus constructing and recording an ID signal from a combination of marks and spaces of approximately the same lengths as the marks and spaces used to record data signals to an optical disk according to the present invention, the pits and lands corresponding to the marks and spaces formed in the area to which the ID signal is recorded are substantially identical to the pits and lands formed in the other areas of the disk. It is therefore possible to use the same molding conditions to manufacture all parts of the disk.

Large mirrored surface areas are also not formed and the entire disk can be molded with alternating marks and spaces of appropriate length, thereby accelerating tracking control and enabling consistent control.

The invention being thus described, it will be obvious that the same may be varied in many ways. Such variations are not to be regarded as a departure from the spirit and scope of the invention, and all such modifications as would be obvious to one if ordinary skilled in the art are intended to be included within the scope of the present invention reflected in the claims.

What is claimed is:

1. An optical disk having one or more recording tracks formed concentrically or spirally on a disk to which data signals are recorded on the tracks, said optical disk comprising:

a user data area for storing user data using different-length marks which vary between a maximum length Tmax and a minimum length Tmin and different-length spaces which also vary between the maximum length Tmax and the minimum length Tmin; and an ID signal area for storing an ID signal using at least first and second marks and first and second spaces, said first mark and said first space both having a first predetermined length selected from various lengths in said different-length marks, and said second mark and said second space both having a second predetermined length selected from various lengths in said different-length marks, said ID signal being stored a plurality of turns of tracks with the same length marks aligned in radial direction.

2. An optical disk according to claim 1, wherein said ID signal area is located at the inner most side of the disk.

3. An optical disk according to claim 1, wherein said first predetermined length is approximately equal to said minimum length Tmin.

4. An optical disk according to claim 1, wherein said second predetermined length is approximately equal to said maximum length Tmax.

5. An optical disk according to claim 1, wherein said tracks in said user data area and said ID signal area are formed by grooves, and said marks and spaces in said user data area and said ID signal area are formed by interrupting the continuous length of the grooves.

6. An optical disk according to claim 1, wherein said ID signal area has no address marks.

7. An optical disk according to claim 1, wherein said first mark and said first space are repeated M (M is a positive integer) times defining a first pattern and subsequently said second mark and said second space are repeated N (N is a positive integer) times defining a second pattern.

8. An optical disk according to claim 7, wherein said second pattern and said first pattern in a pair are repeated at least three times with said M being gradually changed from small to large.

9. An optical disk according to claim 7, wherein said second pattern and said first pattern in a pair are repeated at least three times with said M being gradually changed from large to small.

10. An optical disk reproduction apparatus for reproducing an optical disk having one or more recording tracks formed concentrically or spirally on a disk to which data signals are recorded on the tracks, said optical disk comprising:

a user data area for storing user data using different-length marks which vary between a maximum length Tmax and a minimum length Tmin and different-length spaces which also vary between the maximum length Tmax and the minimum length Tmin; and an ID signal area for storing an ID signal using at least first and second marks and first and second spaces, said first mark and said first space both having a first predetermined length selected from various lengths in said different-length marks, and said second mark and said second space both having a second predetermined length selected from various lengths in said different-length marks, said ID signal being stored in a plurality of turns of tracks with the same length marks aligned in a radial direction, said optical disk reproduction apparatus comprising:
   reading means for reading marks and spaces from said optical disk and for producing an RF signal;
   accessing means for accessing said reading means to said ID signal area for reading said ID signal by said reading means.

11. An optical disk reproduction apparatus for reproducing an optical disk having one or more recording tracks formed concentrically or spirally on a disk to which data signals are recorded on the tracks, said optical disk comprising:

a user data area for storing user data using different-length marks which vary between a maximum length Tmax and a minimum length Tmin and different-length spaces which also vary between the maximum length Tmax and the minimum length Tmin; and an ID signal area for storing an ID signal using at least first and second marks and first and second spaces, said first mark and said first space both having a first predetermined length selected from various lengths in said different-length marks, and said second mark and said second space both having a second predetermined length selected from various lengths in said different-length marks, said ID signal being stored in a plurality of turns of tracks with the same length marks aligned in a radial direction, said first mark and said first space being repeated M (M is a positive integer) times defining a first pattern and subsequently said second mark and said second space being repeated N (N is a positive integer) times defining a second pattern;

said optical disk reproduction apparatus comprising:
   reading means for reading marks and spaces from said optical disk and for producing an RF signal; and
   accessing means for accessing said reading means to said ID signal area for reading said ID signal by said reading means.

12. An optical disk reproduction apparatus according to claim 11, further comprising:

first pattern detection means for detecting said first pattern; and second pattern detection means for detecting said second pattern.

13. An optical disk reproduction apparatus according to claim 12, wherein said first and second pattern detection means comprises:

digitizing means for producing a digitizing signal representing said first and second patterns;

edge detection means for detecting edges of said digitized signal and for producing edge pulses;

clock pulse generation means for generating clock pulses, said clock pulses having a polarity opposite to said edge pulses;

integration means for integrating said edge pulses and said clock pulses and producing an integrated value; and comparator means for comparing said integrated value with a predetermined threshold value, whereby said first or second pattern is detected when said integrated value exceeds or falls below said threshold value, respectively.

14. An optical disk reproduction apparatus according to claim 11, wherein said second pattern and said first pattern in a pair are repeated at least three times with said M being gradually changed, and further comprising:

envelop detection means for detecting an envelop of said second and first patterns in the pair being repeated at least three times;

detecting means for detecting said second pattern;

counting means for counting the lengths of said first patterns in at least three sequentially;

comparing means for comparing said lengths of said first patterns in at least three sequentially with a predetermined three values, whereby a disk type is detected when said lengths of said first patterns in at least three sequentially matches with said predetermined three values.

15. An optical disk reproduction apparatus according to claim 14, further comprising:

a voltage drop detection means for detecting an instantaneous voltage drop in said first and second pattern and for producing a reset signal, said reset signal being used for resetting said counting means.

* * * * *